(12) United States Patent
Albrecht et al.

(10) Patent No.: US 8,059,350 B2
(45) Date of Patent: Nov. 15, 2011

(54) PATTERNED MAGNETIC RECORDING DISK WITH PATTERNED SERVO SECTORS HAVING CHEVRON SERVO PATTERNS

(75) Inventors: Thomas R. Albrecht, San Jose, CA (US); Jonathan Darrel Coker, Rochester, MN (US); Ricardo Ruiz, San Bruno, CA (US); Bruce Alexander Wilson, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/604,333

(22) Filed: Oct. 22, 2009

(65) Prior Publication Data

US 2011/0096436 A1 Apr. 28, 2011

(51) Int. Cl.
*G11B 5/09* (2006.01)
(52) U.S. Cl. .......................... 360/48; 360/135
(58) Field of Classification Search .................. None
See application file for complete search history.

(56) References Cited

U.S. PATENT DOCUMENTS

| | | | |
|---|---|---|---|
| 5,766,718 A | 6/1998 | Matsuda et al. | |
| 6,042,998 A | 3/2000 | Brueck et al. | |
| 6,421,195 B1 | 7/2002 | Rubin et al. | |
| 6,529,341 B1 * | 3/2003 | Ishida et al. | 360/48 |
| 6,680,079 B1 * | 1/2004 | Stirniman et al. | 427/130 |
| 6,746,825 B2 | 6/2004 | Nealey et al. | |
| 7,080,596 B2 | 7/2006 | Lee et al. | |
| 7,110,209 B2 * | 9/2006 | Ehrlich et al. | 360/77.08 |
| 7,347,953 B2 | 3/2008 | Black et al. | |
| 7,612,961 B2 * | 11/2009 | Yamamoto | 360/48 |
| 2004/0241574 A1 | 12/2004 | Dai et al. | |
| 2006/0134556 A1 | 6/2006 | Nealey et al. | |
| 2006/0276043 A1 | 12/2006 | Johnson et al. | |
| 2007/0092650 A1 | 4/2007 | Albrecht et al. | |
| 2007/0121375 A1 | 5/2007 | Sewell | |
| 2010/0103554 A1 * | 4/2010 | Izumi | 360/76 |

FOREIGN PATENT DOCUMENTS

| | | |
|---|---|---|
| JP | 2000113533 | 4/2000 |
| WO | 2007058324 | 5/2007 |

OTHER PUBLICATIONS

Bandic et al., "Patterned magnetic media: impact of nanoscale patterning on hard disk drives", Solid State Technology S7+ Suppl. S, Sep. 2006.

(Continued)

*Primary Examiner* — Jason Olson
(74) *Attorney, Agent, or Firm* — Thomas R. Berthold

(57) ABSTRACT

A patterned-media perpendicular magnetic recording disk has patterned servo regions and is nanoimprinted from a master mold made using directed self-assembly of block copolymers. The disk has patterned concentric circular data tracks of discrete data islands, with the tracks having a track pitch in the radial or cross-track direction. The disk also has patterned servo sectors extending generally radially across the patterned data tracks. The servo pattern is a chevron pattern of slanted or non-radial stripes that have a stripe pitch in the cross-stripe direction substantially equal to the track pitch. As a result of the method of making the master mold, the nanoimprinted disk has a chevron servo pattern with non-radial stripes that are magnetized segments of radial lines separated by nonmagnetic spaces.

8 Claims, 10 Drawing Sheets

OTHER PUBLICATIONS

Terris et al., "Topical Review: Nanofabricated and self-assembled magnetic structures as data storage media", J. Phys. D: Appl. Phys. 38 (2005) R199-R222.

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731-1736.

Kim et al., "Rapid Directed Self-Assembly of Lamellar Microdomains from a Block Copolymer Containing Hybrid", Proc. of SPIE vol. 6921, 692129, (2008).

Kim et al., "Device-Oriented Directed Self-Assembly of Lamella Microdomains from a Block Copolymer Containing Hybrid", Proc. of SPIE vol. 6921, 69212B, (2008).

Kim et al., "Self-Aligned, Self-Assembled Organosilicate Line Patterns of ~20nm Half-Pitch from Block Copolymer Mediated Self-Assembly", Proc. of SPIE vol. 6519, 65191H, (2007).

Black, C. T. et al., "Polymer self assembly in semiconductor microelectronics", IBM Journal of Research and Development, vol. 51, No. 5, p. 605 (2007).

Thurn-Albrecht, T. et al., "Nanoscopic Templates from Oriented Block Copolymer Films", Advanced Materials 2000, 12, 787.

* cited by examiner

PATTERNED MAGNETIC RECORDING DISK WITH PATTERNED SERVO SECTORS HAVING CHEVRON SERVO PATTERNS

BACKGROUND OF THE INVENTION

1. Field of the Invention

This invention relates generally to patterned-media magnetic recording disks with patterned servo sectors, and to a method for making a master mold for nanoimprinting the patterned-media disks.

2. Description of the Related Art

Magnetic recording hard disk drives with patterned magnetic recording media have been proposed to increase data density. In patterned media, the magnetic recording layer on the disk is patterned into small isolated data islands arranged in concentric data tracks. To produce the required magnetic isolation of the patterned data islands, the magnetic moment of spaces between the islands must be destroyed or substantially reduced to render these spaces essentially nonmagnetic. In one type of patterned media, the data islands are elevated regions or pillars that extend above "trenches" and magnetic material covers both the pillars and the trenches, with the magnetic material in the trenches being rendered nonmagnetic, typically by "poisoning" with a material like silicon (Si). In another type of patterned media, the magnetic material is deposited first on a flat disk substrate. The magnetic data islands are then formed by milling, etching or ion-bombarding of the area surrounding the data islands.

Like conventional non-patterned or continuous-media disks, patterned-media disks are also required to have non-data servo regions that are used for read/write head positioning. The servo regions in the pre-etched type of patterned-media disks with elevated spaced-apart data pillars may also be patterned and thus contain elevated nondata servo islands or pillars that are separated by trenches. The servo pillars are typically "servowritten" or pre-magnetized during the manufacturing process and are not intended to be rewritten during normal operation of the disk drive. The proposed method for servowriting this type of disk is to DC "erase" the disk during manufacturing with a large magnet, leaving all of the servo pillars magnetized in the same direction. Thus for a patterned-media perpendicular magnetic recording disk, all of the servo pillars will have the same magnetization direction, i.e., either "into" or "out of" the surface of the disk. However, unlike the pattern of data pillars which are generally a periodic pattern of lines or dots, the servo pillars typically have different shapes and do not form a periodic pattern, but are generally arbitrary.

One proposed method for fabricating patterned-media disks is by nanoimprinting with a template or mold, sometimes also called a "stamper", that has a topographic surface pattern. In this method the magnetic recording disk substrate with a polymer film on its surface is pressed against the mold. The polymer film receives the reverse image of the mold pattern and then becomes a mask for subsequent etching of the disk substrate to form the pillars on the disk. In one type of patterned media, the magnetic layer and other layers needed for the magnetic recording disk are then deposited onto the etched disk substrate and the tops of the pillars to form the patterned-media disk. In another type of patterned media, the magnetic layers and other layers needed for the magnetic recording disk are first deposited on the flat disk substrate. The polymer film used with nanoimprinting is then pressed on top of these layers. The polymer film receives the reverse image of the mold pattern and then becomes a mask for subsequent milling, etching or ion-bombarding the underlying layers. The mold may be a master mold for directly imprinting the disks. However, the more likely approach is to fabricate a master mold with a pattern of pillars corresponding to the pattern of pillars desired for the disks and to use this master mold to fabricate replica molds. The replica molds will thus have a pattern of recesses or holes corresponding to the pattern of pillars on the master mold. The replica molds are then used to directly imprint the disks. Nanoimprinting of patterned media is described by Bandic et al., "Patterned magnetic media: impact of nanoscale patterning on hard disk drives", *Solid State Technology* S7+ *Suppl. S*, September 2006; and by Terris et al., "TOPICAL REVIEW: Nanofabricated and self-assembled magnetic structures as data storage media", *J. Phys. D: Appl. Phys.* 38 (2005) R199-R222.

The making of the master template or mold is a difficult and challenging process. The use of electron beam (e-beam) lithography using a Gaussian beam rotary-stage e-beam writer is viewed as a possible method to make a master mold capable of nanoimprinting patterned-media disks, but this method limits the areal bit density of patterned-media disks to about 500 Gbit/in$^2$. Directed self-assembly of block copolymers has also been proposed for making the master mold and is believed capable of achieving areal bit densities of greater than 1 Terabit/in$^2$. Pending application Ser. No. 12/141,062, filed Jun. 17, 2008 and assigned to the same assignee as this application, describes the use of directed self-assembly of block copolymers to make a master mold that allows the circumferential density of the subsequently nanoimprinted data pillars to be at least doubled from what could be achieved with a mold fabricated with just e-beam lithography. However, directed self-assembly of block copolymers is not generally practical for making a mold that is required to nanoimprint disks that have both periodic data pillars and generally arbitrary servo pillars.

What is needed is a nanoimprinted patterned-media magnetic recording disk that has patterned servo pillars that are compatible with a master mold that can be fabricated by use of directed self-assembly of block copolymers.

SUMMARY OF THE INVENTION

The invention relates to a patterned-media perpendicular magnetic recording disk that has patterned servo regions and that can be nanoimprinted from a master mold made using directed self-assembly of block copolymers. The disk has patterned concentric circular data tracks of discrete data islands, with the tracks having a track pitch (TP) in the radial or cross-track direction. The disk also has patterned servo sectors extending generally radially across the patterned data tracks. The servo pattern is a chevron pattern of slanted or non-radial stripes that have a stripe pitch in the cross-stripe direction substantially equal to TP.

The invention also relates to a method for making the master mold used to nanoimprint the disk. Conventional or e-beam lithography is used to form a pattern of generally radial traces on a substrate. A first block copolymer material is deposited on the pattern, resulting in directed self-assembly of the first block copolymer into its components to multiply the generally radial traces into generally radial lines. The radial lines preferably have a higher circumferential density than that of the radial traces. Directed self-assembly of a second block copolymer is then used to form a pattern of concentric rings and a pattern of non-radial stripes over the generally radial lines. The concentric rings are used to define the radial width of the data islands formed by the master mold and the non-radial stripes are used to define the cross-stripe width of the stripes forming the chevron pattern. After etching and resist removal, the master mold has a pattern of either pillars or holes, depending on the method used. The pillars or holes are arranged in circular rings in the portions of the mold that will form the data islands in the subsequently nanoimprinted disk. The pillars or holes are arranged in segmented parallel non-radial stripes in the portions of the mold that form the chevron patterns in the subsequently nanoimprinted disk. The method allows the non-radial stripes to be precisely registered with the concentric rings and because the rings and non-radial stripes are fabricated in the same step of directed self-assembly of the second block copolymer the stripe pitch of the non-radial stripes can be substantially the same as the radial pitch of the concentric rings. This allows the disk nanoimprinted by the mold to have stripes in the servo regions with a stripe pitch substantially equal to the track pitch.

As a result of the method of making the master mold, the nanoimprinted disk will have a chevron servo pattern with non-radial stripes that are magnetized segments of radial lines separated by nonmagnetic spaces. However, the master mold may be fabricated in a manner such that the magnetized segments in the stripes are oriented perpendicular to the stripe direction, or in a manner such that the stripes are continuous magnetized stripes without segmentation.

For a fuller understanding of the nature and advantages of the present invention, reference should be made to the following detailed description taken together with the accompanying figures.

DETAILED DESCRIPTION OF THE INVENTION

Figure 1:
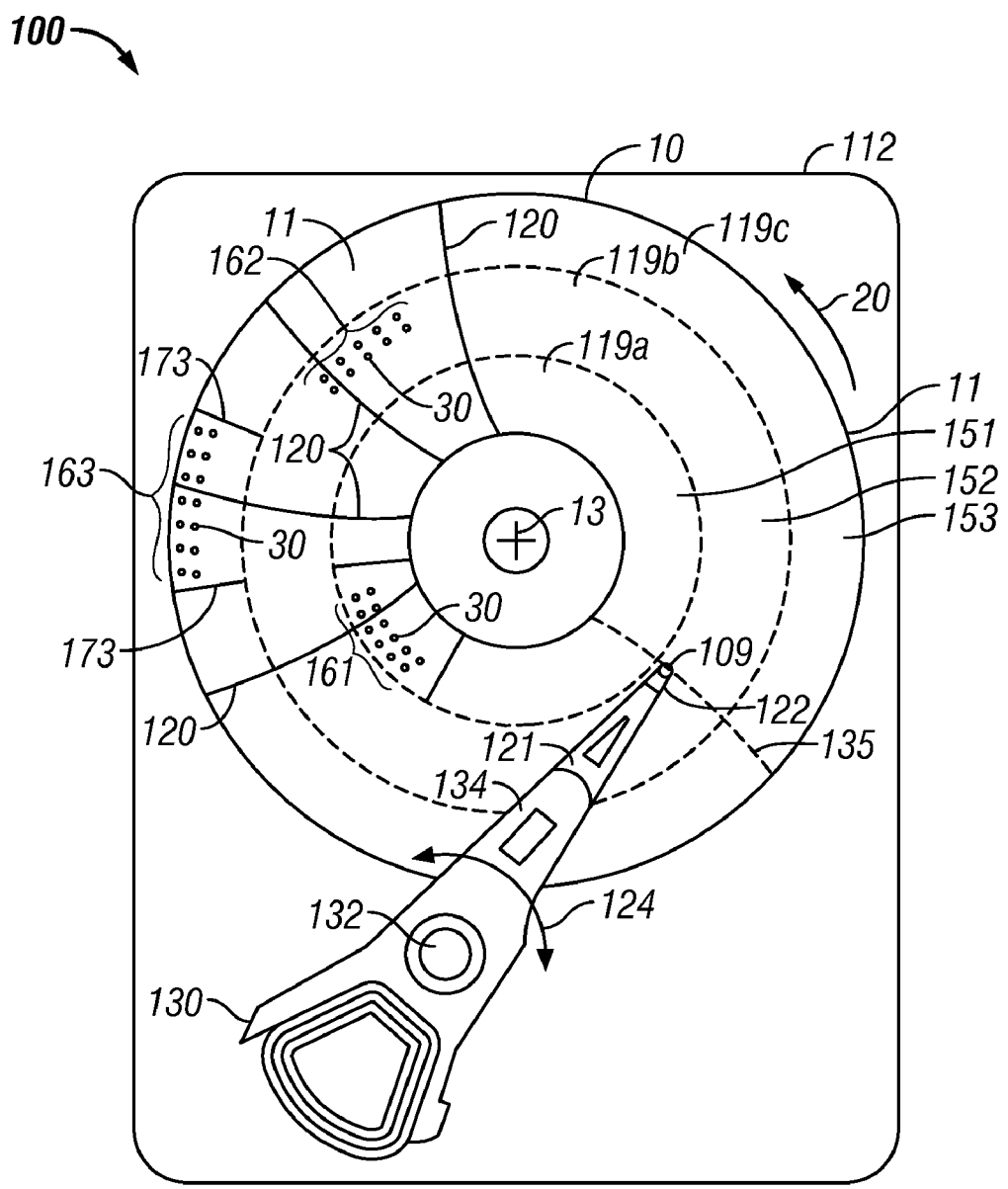
FIG. 1 is a top view of a disk drive with a patterned-media type of magnetic recording disk according to the invention.

FIG. 1 is a top view of a patterned-media disk drive 100 like that to which the present invention relates. The drive 100 has a housing or base 112 that supports an actuator 130 and a spindle motor (not shown) for rotating the patterned magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier, such as an air-bearing slider 122, attached to the other end of suspension 121. The suspension 121 permits the head carrier 122 to be maintained very close to the surface of disk 10. The slider 122 supports the read/write or recording head 109. The recording head 109 is typically a combination of an inductive write head with a magnetoresistive read head (also called a read/write head) and is located on the trailing end or end face of the slider 122. Only one disk surface with associated slider and recording head is shown in FIG. 1, but there are typically multiple disks stacked on a hub that is rotated by a spindle motor, with a separate slider and recording head associated with each surface of each disk.

The patterned magnetic recording disk 10 includes a disk substrate 11 and discrete data islands 30 of magnetizable material on the substrate 11. The data islands 30 function as discrete magnetic bits for the storage of data. Each discrete data island 30 is a magnetized island separated from other islands by nonmagnetic regions or spaces. The term "nonmagnetic" means that the spaces between the data islands are formed of a nonferromagnetic material, such as a dielectric, or a material that has no substantial remanent moment in the absence of an applied magnetic field, or a magnetic material in a groove or trench recessed far enough below the islands to not adversely affect reading or writing. The nonmagnetic spaces between the data islands may also be the absence of magnetic material, such as grooves or troughs in the magnetic recording layer or disk substrate.

The data islands 30 are arranged in radially-spaced generally circular tracks, with the tracks being grouped into annular bands or zones 151, 152, 153. Within each track, the data islands 30 are typically arranged in fixed-byte-length data sectors (e.g., 512 bytes plus additional bytes for error correction coding (ECC) and data sector header). The number of data sectors is different in each zone. The grouping of the data tracks into annular zones permits zoned recording, wherein the angular spacing of the data islands, and thus the data rate, is different in each zone. In FIG. 1, three zones 151, 152, 153 are shown, with only portions of representative concentric data tracks, 161, 162, 163, being shown for each respective zone. While only three zones are depicted in FIG. 1, modern disk drives typically have about 20 zones. In each zone there are also generally radially-directed synchronization (sync) marks, like typical marks 173 in zone 153. Each sync mark 173 may be a plurality of circumferentially-spaced marks, with the angular spacing being different in each zone, that are detected by the read head to enable the write head to be synchronized with the specific spacing of the data islands in that zone. The sync marks may be located in the sector headers for the data sectors. The physical location where data is to be written or read is identified by a head number, track number (also called "cylinder" number when there are multiple disks) and data sector number.

As the disk 10 rotates about its center 13 in the direction of arrow 20, the movement of actuator 130 allows the read/write head 109 on the trailing end of head carrier 122 to access different data tracks and zones on disk 10. Because the actuator 130 is a rotary actuator that pivots about pivot 132, the path of the read/write head 109 across the disk 10 is not a perfect radius but instead an arcuate line 135.

Each data track also includes a plurality of circumferentially or angularly-spaced servo sectors 120 that contain positioning information detectable by the read head for moving the head 109 to the desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 have an arcuate shape that generally replicates the arcuate path 135 of the head 109. The servo sectors 120 are nondata regions on the disk that are magnetized once, typically during manufacturing or formatting of the disk, and are not intended to be erased during normal operation of the disk drive. While the sync marks (like sync marks 173) may be located in the sector headers for the data sectors, as an alternative they may be located in the servo sectors 120.

Figure 2:
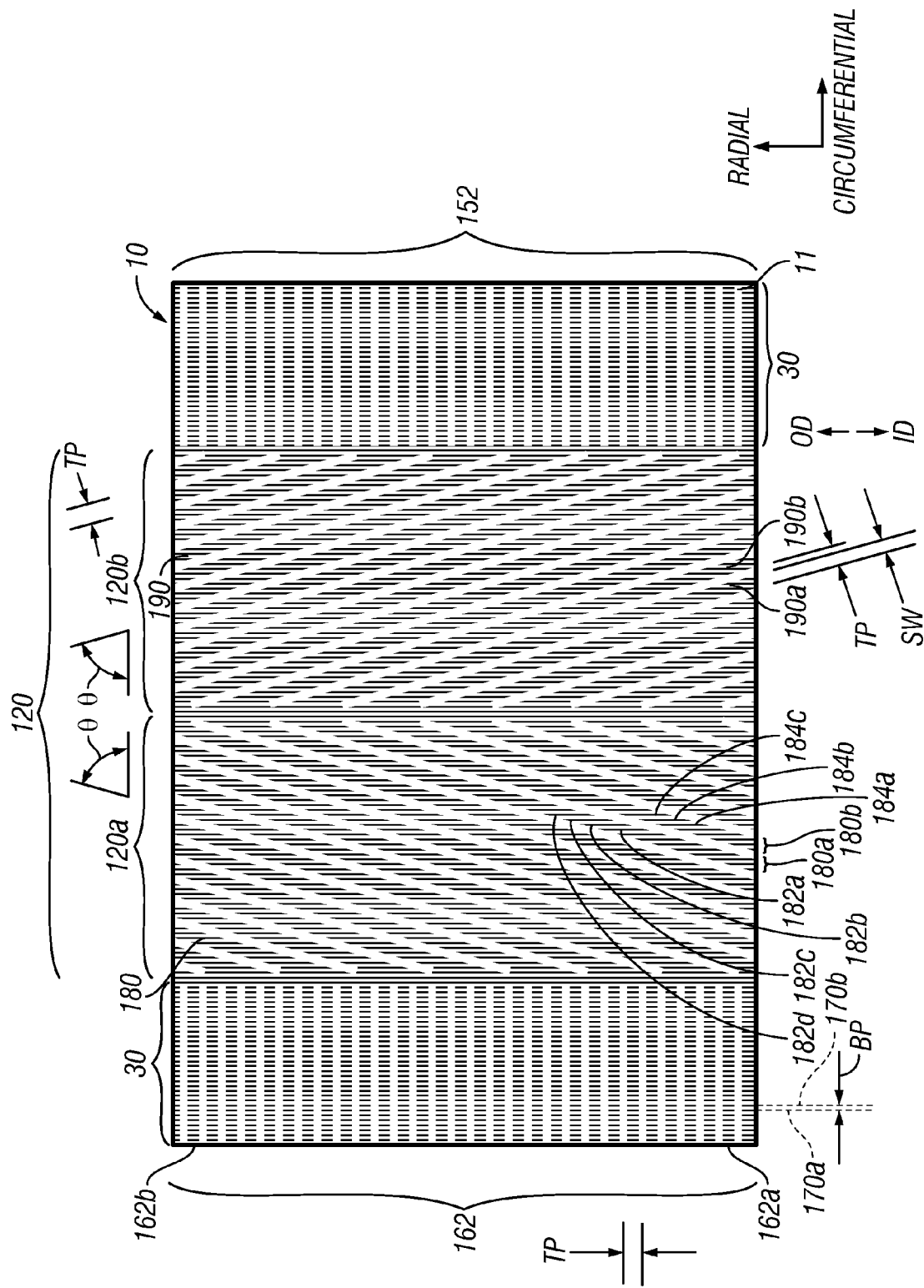
FIG. 2 is a top view of an enlarged portion of the patterned-media magnetic recording disk according to the invention showing the arrangement of the patterned data tracks and patterned servo sector in one of the zones on the surface of the disk substrate.

FIG. 2 is a top view of an enlarged portion of the patterned-media perpendicular magnetic recording disk 10 according to the invention. The portion is a portion of zone 152 with data tracks 162 having data islands 30 and a servo sector 120 extending generally radially across the data tracks 162. The data islands 30 are spaced apart by a nearly fixed circumferential or along-the-track spacing or bit pitch (BP). The data tracks 162 are spaced apart by a nearly fixed radial or cross-track spacing or track pitch (TP). In patterned media, the bit-aspect-ratio (BAR) of the pattern of discrete data islands 30 arranged in concentric tracks 162 is the ratio of TP to BP. This is the same as the ratio of linear island density in bits per inch (BPI) in the along-the-track direction to the track density in tracks per inch (TPI) in the cross-track direction. While the islands 30 are shown as being rectangularly shaped, they may have other shapes, such as circular or generally rectangularly or generally elliptical. The islands 30 are also arranged into generally radial lines, as shown by typical radial lines 170a, 170b, that extend from disk center 13 (FIG. 1). Because FIG. 2 shows only a small portion of the disk substrate 11 with only a small number of data tracks 162, the pattern of islands 30 appears to be two sets of perpendicular lines. However, the data tracks 162 are concentric rings centered about the center 13 of disk 10 and the lines 170a, 170b are not parallel lines, but radial lines extending from the center 13 of disk 10. Thus the angular spacing between adjacent islands as measured from the center 13 of the disk for adjacent islands in lines 170a, 17b in a radially inner track towards the inside diameter (ID) (like track 162a) is the same as the angular spacing for adjacent islands in lines 170a, 170b in a radially outer track towards the outside diameter (OD) (like track 162b). The generally radial lines 170a, 170b may be perfectly straight radial lines but are preferably arcs or arcuate-shaped radial lines that replicate the arcuate path 135 (FIG. 1) of the read/write head on the rotary actuator. Such arcuate-shaped radial lines provide a constant phase position of the data islands as the head sweeps across the data tracks. There is a very small radial offset between the read head and the write head, so that the synchronization field (like field 173 in zone 163 in FIG. 1) used for writing on a track is actually read from a different track. If the islands between the two tracks are in phase, which is the case if the radial lines are arcuate-shaped, then writing is greatly simplified.

The patterned-media disk 10 also includes patterned servo sectors 120. In the patterned-media disk according to the invention as shown in FIG. 2, each of the servo sectors 120 includes a V-shaped pattern or inverted V-shaped pattern (sometimes called a chevron pattern) of circumferentially adjacent fields 120a, 120b of parallel non-radial magnetized stripes 180, 190, respectively. The stripes 180 in field 120a are slanted in one direction (to the right in FIG. 2) relative to data tracks 162 at an acute angle θ, and the stripes 190 in field 120b are slanted in a different direction (to the left in FIG. 2) relative to data tracks 162 at an acute angle, preferably the same angle θ. The stripes 180, 190 are preferably magnetized in the same direction, i.e., in a direction either perpendicularly into or out of the plane of the disk substrate 11, preferably by being DC-magnetized after the disk has been fabricated.

A chevron servo pattern is well-known for conventional disk drives with conventional non-patterned media. The readback signal registers a sinusoid as the read head passes over each of the two fields of the chevron pattern. If the radial position of the head varies, the phase of one sinusoid will be advanced while the phase of the other sinusoid will be retarded. Thus the radial position of the head can be estimated by measuring the phase difference between the two sinusoidal readback signals. Single-frequency Fast Fourier Transform (FFT) methods can generate the necessary phase estimates and are near-maximum-likelihood estimators in the presence of white noise and if the signals are high density. More complex estimators based on non-sinusoidal inputs or more general noise phenomenon can achieve somewhat better performance. The measured phase difference from a chevron servo pattern yields only the fractional part of the head radial position, i.e., the fractional part of one complete radial span of the chevron pattern, because the phase measurement will be the same result for two head positions differing by an integer multiple of the chevron pattern period. Thus in the conventional servo system with a chevron servo pattern, the integer part of the radial head position, i.e. the actual track number, is determined by demodulation of a gray-coded track identification (ID), which is typically located near the start of a servo sector before the chevron pattern. In a servo system for patterned media, like the one shown in this invention, the stripes 180, 190 in the chevron servo fields 120a, 120b are comprised of discrete island segments (like segments 184a-c) and thus the readback signal will not be strictly the same as the readback signal from a conventional servo pattern. In a patterned-media servo pattern like the one shown in FIG. 2, the readback signal will respond to the magnetized islands separated in the circumferential direction by $L_{circ}$, and at the same time it will also be modulated by the spacing and acute angle of the non-radial stripes 180, 190. The result is a readback signal whose amplitude is modulated by an "envelope" that is similar to the sinusoidal signal from a conventional chevron servo pattern as explained above.

Patterned-media perpendicular magnetic recording disks like that shown in FIG. 2 have the magnetization directions in the magnetizable recording material (data islands 30 and non-radial stripes 180, 190) perpendicular to or out-of-the-plane of the recording layer. To produce the required magnetic isolation of the patterned data islands and stripes, the magnetic moment of the regions between the islands and stripes must be destroyed or substantially reduced to render these spaces essentially nonmagnetic. Patterned media may be fabricated by any of several known techniques. In one type of patterned media, the data islands are elevated, spaced-apart pillars that extend above the disk substrate surface to define troughs or trenches on the substrate surface between the pillars. This type of patterned media is shown in the sectional view in FIG. 3A wherein only a few data islands 30 are depicted. In this type of patterned media the substrate 11 with a pre-etched pattern of pillars 31 and regions or trenches 32 between the pillars can be produced with relatively low-cost, high volume nanoimprinting process using a master template or mold. The magnetic recording layer material is then deposited over the entire surface of the pre-etched substrate to cover both the ends of the pillars 31 and the trenches between the pillars 31, resulting in the data islands 30 of magnetic recording layer material and trenches 32 of magnetic recording layer material. The trenches 32 of recording layer material may be spaced far enough from the read/write head to not adversely affect reading or writing to the recording layer material in islands 30, or the trenches may be rendered nonmagnetic by "poisoning" with a material like Si. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

Figure 3A:
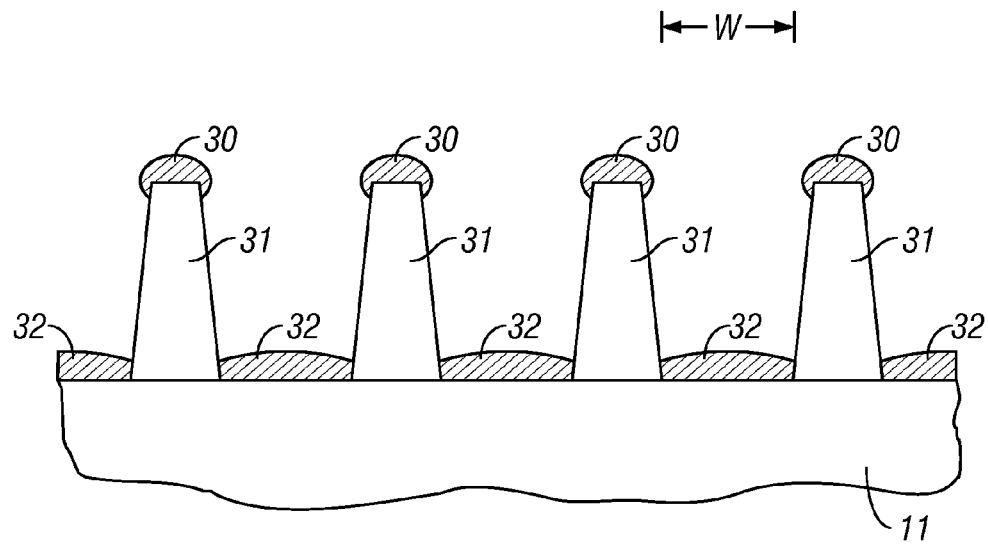
FIG. 3A is a side sectional view of a portion of the patterned-media disk showing the data islands as elevated, spaced-apart pillars that extend above the disk substrate surface with trenches between the pillars.
Figure 3B:
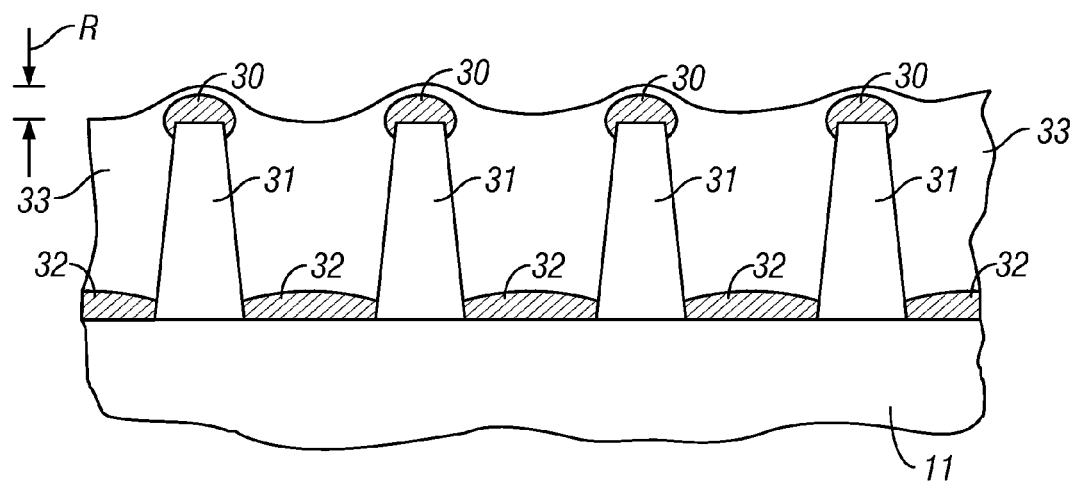
FIG. 3B is a side sectional view of the portion of the disk of FIG. 3A after planarization.

FIG. 3B shows the patterned-media disk of FIG. 3A after planarization with a planarization layer 33. Layer 33 may be a cured functionalized perfluorinated polyether (PFPE) polymer. The functionalized-PFPE is applied by dipping the disk into a solution of the functionalized-PFPE in a suitable solvent and then evaporating the solvent. One type of functionalized-PFPE is Fomblin® Z type with acrylate functional end groups, like that described in the U.S. Pat. No. 6,680,079 B2, that can be cross-linked via exposure to ultraviolet (UV) radiation. FIG. 3B shows that after curing there may be shrinkage of the planarization layer 33, resulting in a recession "R" of the layer 33 in the trenches 32, where R is a measure of the variation in surface topography of the layer 33 between the islands 30 and trenches 32. The actual amount of recession depends strongly on D and W, where D is the distance between the trenches 32 and the tops of the islands 30 and is approximately the height of the pillars 31, and W is approximately the gap width between the pillars 31. Recession thus becomes more of a problem and planarization of the disk thus becomes more difficult if there is a wide variation in W in different regions of the disk, such as between the data regions and servo regions.

In this invention the features that define the parallel non-radial stripes 180, 190 in the master template for the servo sector 120 are formed in the same fabrication step as the data tracks 162. Referring again to FIG. 2, the stripes 180, 190 have a stripe spacing or pitch in a direction perpendicular to the stripes that is substantially the same as the data track pitch TP, i.e., the stripe pitch is equal to TP +/−5% TP. Also, as shown by stripes 190a, 190b, each stripe has a stripe width (SW) that is substantially equal to the radial width of the data islands. Thus the value W (FIG. 3B) is substantially the same in both the data region and the servo region, which minimizes recession of the planarization layer.

Fabrication of the non-radial stripes 180, 190 and the data tracks 162 in the same step also provides for very precise spatial registration of the servo pattern with the data tracks. The servo pattern of stripes with stripe pitch TP provides for much better signal-to-noise ratio (SNR) than a servo pattern with marks having a pitch equal to the BP. This is because DC-magnetized marks (all islands having the same orientation of magnetization) have a lower SNR than islands of alternating magnetization for a given read head. The SNR of DC-magnetized servo signals can be improved then by using a longer pitch of the servo stripes (such as TP).

As shown in FIG. 2, the chevron pattern of stripes 180, 190 repeats every four data tracks in the radial direction. Thus, the chevron pattern creates a servo position signal that is periodic every four tracks. A different radial periodicity can be chosen by changing the slope (the angle θ) of the stripes 180, 190. The radial periodicity of the chevron pattern does not need to be an integer multiple of the data tracks so long as it is a known mathematical relationship that describes the registration of the chevron pattern to the data tracks. Preferably the radial periodicity of the chevron pattern is between about 2 to 10 data tracks.

In this invention only the fractional part of the head radial position within the radial span of one chevron pattern (four data track in the example of FIG. 2) is capable of being determined from the chevron pattern of stripes 180, 190. As in the conventional servo systems with chevron patterns, higher order bits of the track numbers (track IDs) are written in a separate servo writing step to a region outside of the chevron patterns, typically immediately preceding the chevron patterns in time as the read head reads the servo sector headers.

Referring again to FIG. 2, each of the stripes 180, 190 contains segments of magnetized material separated by nonmagnetic spaces. For example, stripe 180a includes typical magnetized segments 182a, 182b, 182c, 182d separated by nonmagnetic spaces. Similarly adjacent stripe 180b includes typical magnetized segments 184a, 184b, 184c separated by nonmagnetic spaces. The segmented stripes 180, 190 are the result of the disk being nanoimprinted from a master mold fabricated according to a method of this invention. As shown in FIG. 2, the magnetized segments in different stripes are part of radial lines, like radial lines 170a, 170b. For example, segment 182c in stripe 180a and segment 184a in stripe 180b are part of the same radial line. Similarly, segment 182d in stripe 180a and segment 184b in stripe 180b are part of the same radial line. Because the features that define the radial lines in the data tracks and the servo region 120 are formed in the same fabrication process they have substantially the same circumferential or along-the-track pitch. Thus the magnetized segment pitch in the along-the-track direction is substantially equal to BP, i.e., the segment pitch is equal to BP +/−5% BP.

The disk shown in FIG. 2 is fabricated by nanoimprinting from a master template or mold. The making of the master template or mold to achieve an ultrahigh density patterned-media disk is a difficult and challenging process. The use of electron beam (e-beam) lithography using a Gaussian beam rotary-stage e-beam writer is viewed as a possible method to make the master mold. However, to achieve patterned-media disks with both higher areal bit density (greater than 1 Tbit/in$^2$) and a higher BAR (greater than 1, preferably equal to or greater than 2), a track pitch of about 50 nm and an island pitch of about 12.5 nm will be required, which would result in a BAR of 4. A master mold capable of nanoimprinting patterned-media disks with an island pitch of 12.5 nm is difficult to fabricate due to the limited resolution of e-beam lithography. Further increases in areal density will require even smaller and denser features. For example, an areal density of 5 Tb/in$^2$ with a BAR of 2 will require an island pitch along-the-track of 8 nm.

The present invention relates to a method for making a master mold that is used in the nanoimprinting process to make patterned-media disks with an island pitch (BP) difficult to achieve with the resolution of e-beam lithography, and with chevron servo patterns registered to the data tracks. The master mold may be used to directly nanoimprint the disks, but more likely is used to make replica molds which are then used to directly nanoimprint the disks. The method uses conventional or e-beam lithography to form a pattern of generally radial traces on a substrate, with the traces being grouped into annular zones or bands. A first block copolymer material is deposited on the pattern, resulting in directed self-assembly of the first block copolymer into its components to multiply the generally radial traces into generally radial lines. The radial lines preferably have a higher circumferential density than that of the radial traces.

Directed self-assembly of a second block copolymer is then used to form a pattern of concentric rings and a pattern of non-radial stripes over the generally radial lines. The concentric rings are used to define the radial width of the islands formed by the master mold and the non-radial stripes are used to define the cross-stripe width (SW) of the stripes forming the chevron pattern. After etching and resist removal, the master mold has a pattern of either pillars or holes, depending on the method used. The pillars or holes are arranged in circular rings in the portions of the mold that will be used to form the data islands in the subsequently nanoimprinted disk. The rings are grouped into annular zones. The pillars or holes are arranged in segmented parallel non-radial stripes in the portions of the mold that will be used to form the servo sectors in the subsequently nanoimprinted disk. The radial spacing of the concentric rings is selected so that following the etching process the master mold has an array of pillars or holes with the desired BAR, which is greater than 1, preferably about 2 or greater. Because the method allows the circumferential density of the master mold pillars or holes to be at least doubled from what could be achieved with just e-beam lithography, the subsequently nanoimprinted patterned-media disks can have both a high BAR (greater than 1 and preferably equal to or greater than 2) and an ultra-high areal density. The method allows the non-radial stripes to be precisely registered with the concentric rings and because the rings and non-radial stripes are fabricated in the same step of directed self-assembly of the second block copolymer the stripe pitch of the non-radial stripes can be substantially the same as radial pitch of the concentric rings.

Self-assembling block copolymers have been proposed for creating periodic nanometer (nm) scale features. A self-assembling block copolymer typically contains two or more different polymeric block components, for example components A and B, that are immiscible with one another. Under suitable conditions, the two or more immiscible polymeric block components separate into two or more different phases or microdomains on a nanometer scale and thereby form ordered patterns of isolated nano-sized structural units. There are many types of block copolymers that can be used for forming the self-assembled periodic patterns. If one of the components A or B is selectively removable without having to remove the other, then an orderly arranged structural units of the un-removed component can be formed. There are numerous references describing self-assembling block copolymers, including U.S. Pat. No. 7,347,953 B2; Kim et al., "Rapid Directed Self-Assembly of Lamellar Microdomains from a Block Copolymer Containing Hybrid", *Proc. of SPIE* Vol. 6921, 692129, (2008); Kim et al., "Device-Oriented Directed Self-Assembly of Lamella Microdomains from a Block Copolymer Containing Hybrid", *Proc. of SPIE* Vol. 6921, 69212B, (2008); and Kim et al., "Self-Aligned, Self-Assembled Organosilicate Line Patterns of ~20 nm Half-Pitch from Block Copolymer Mediated Self-Assembly", *Proc. of SPIE* Vol. 6519, 65191H, (2007).

Specific examples of suitable block copolymers that can be used for forming the self-assembled periodic patterns include, but are not limited to: poly(styrene-block-methyl methacrylate) (PS-b-PMMA), poly(ethylene oxide-block-isoprene) (PEO-b-PI), poly(ethylene oxide-block-butadiene) (PEO-b-PBD), poly(ethylene oxide-block-styrene) (PEO-b-PS), poly(ethylene oxide-block-methylmethacrylate) (PEO-b-PMMA), poly(ethyleneoxide-block-ethylethylene) (PEO-b-PEE), poly(styrene-block-vinylpyridine) (PS-b-PVP), poly(styrene-block-isoprene) (PS-b-PI), poly(styrene-block-butadiene) (PS-b-PBD), poly(styrene-block-ferrocenyldimethylsilane) (PS-b-PFS), poly(butadiene-block-vinylpyridine) (PBD-b-PVP), poly(isoprene-block-methyl methacrylate) (PI-b-PMMA), and poly(styrene-block-dymethylsiloxane) (PS-b-PDMS).

The specific self-assembled periodic patterns formed by the block copolymer are determined by the molecular volume ratio between the first and second polymeric block components A and B. When the ratio of the molecular volume of the second polymeric block component B over the molecular volume of the first polymeric block component A is less than about 80:20 but greater than about 60:40, the block copolymer will form an ordered array of cylinders composed of the first polymeric block component A in a matrix composed of the second polymeric block component B. When the ratio of the molecular volume of the first polymeric block component A over the molecular volume of the second polymeric block component B is less than about 60:40 but is greater than about 40:60, the block copolymer will form alternating lamellae composed of the first and second polymeric block components A and B. In the present invention, the un-removed component is to be used as an etch mask, so ordered arrays of alternating lamellae and alternating cylinders are of interest.

The periodicity or bulk period ($L_0$) of the repeating structural units in the periodic pattern is determined by intrinsic polymeric properties such as the degree of polymerization N and the Flory-Huggins interaction parameter $\chi$. $L_0$ scales with the degree of polymerization N, which in turn correlates with the molecular weight M. Therefore, by adjusting the total molecular weight of the block copolymer of the present invention, the bulk period ($L_0$) of the repeating structural units can be selected.

To form the self-assembled periodic patterns, the block copolymer is first dissolved in a suitable solvent system to form a block copolymer solution, which is then applied onto a surface to form a thin block copolymer layer, followed by annealing of the thin block copolymer layer, which causes phase separation between the different polymeric block components contained in the block copolymer. The solvent system used for dissolving the block copolymer and forming the block copolymer solution may comprise any suitable solvent, including, but not limited to: toluene, propylene glycol monomethyl ether acetate (PGMEA), propylene glycol monomethyl ether (PGME), and acetone. The block copolymer solution can be applied to the substrate surface by any suitable techniques, including, but not limited to: spin casting, coating, spraying, ink coating, dip coating, etc. Preferably, the block copolymer solution is spin cast onto the substrate surface to form a thin block copolymer layer. After application of the thin block copolymer layer onto the substrate surface, the entire substrate is annealed to effectuate microphase segregation of the different block components contained by the block copolymer, thereby forming the periodic patterns with repeating structural units.

The block copolymer films in the above-described techniques self-assemble without any direction or guidance. This undirected self-assembly results in patterns with defects so it is not practical for applications that require long-range ordering, such as for making annular zones of radial lines on a master mold for nanoimprinting patterned-media disks.

Lithographically patterned surfaces have been proposed to guide or direct the self-assembly of block copolymer domains. One approach uses interferometric lithography to achieve ordering of the domains with registration of the underlying chemical contrast pattern on the substrate. Lamellar and cylindrical domains may be formed on a substrate by this technique, as described in U.S. Pat. No. 6,746,825. However, interferometric lithography cannot be used to make annular zones of radial lines. US 2006/0134556 A1 describes techniques for creating a chemical contrast pattern to guide the self-assembly of block copolymers to form aperiodic patterns. Also, in both of these approaches to create chemical contrast patterns on the substrate to guide the self-assembly of block copolymers, the periodicity of the underlying chemical contrast pattern matches the bulk period $L_0$ of the block copolymer. For example, in US 2006/0134556A1, $L_0$ is about 40 nm, so the lithographically-patterned substrate used to guide the self-assembly also has a period of about 40 nm, which can be achieved by conventional or e-beam lithography. However, it is difficult to use conventional or e-beam lithography to create a chemical contrast pattern for a block copolymer with $L_0$ between about 8 nm and 30 nm.

The method of this invention for making the master mold uses conventional optical or e-beam lithography to form a pattern of generally radial traces on a substrate, with the traces being grouped into annular zones or bands. A first block copolymer material with bulk period $L_0=L_{rad}$ is deposited on the pattern, resulting in directed self-assembly of the block copolymer into its components to multiply the generally radial traces into generally radial lines of alternating block copolymer components. The radial lines of one of the components are removed, leaving the radial lines of the remaining component of the first block copolymer. A protective layer is then deposited over the radial lines of the remaining component of the first block copolymer to prevent their movement during subsequent processing. Then, a second block copolymer material with bulk period $L_0=L_{circ}$ is deposited over these radial lines to define generally circumferential rings and non-radial stripes. The circumferential rings and non-radial stripes of one of the components of the second block copolymer are removed, leaving the circumferential rings and non-radial stripes of the remaining component of the second block copolymer. The circumferential rings and non-radial stripes of the remaining second block copolymer component and the underlying radial lines of the remaining first block copolymer component form a grid that functions as a lithographic mask. Etching of the substrate through this mask, followed by removal of the remaining block copolymer material, results in a master mold with a pattern of recesses or holes arranged in circular rings, with the rings grouped into annular zones, and with a pattern of segmented non-radial stripes. Alternatively, plating or deposition of a suitable material on top of the block copolymer grid followed by removal of the remaining block copolymer material results in a master mold with a pattern of dots or pillars arranged in circular rings, with the rings grouped into annular zones and with a pattern of segmented non-radial stripes. The ratio of $L_{circ}/L_{rad}$ defines the BAR for the disk made from the mold.

Figure 4A:
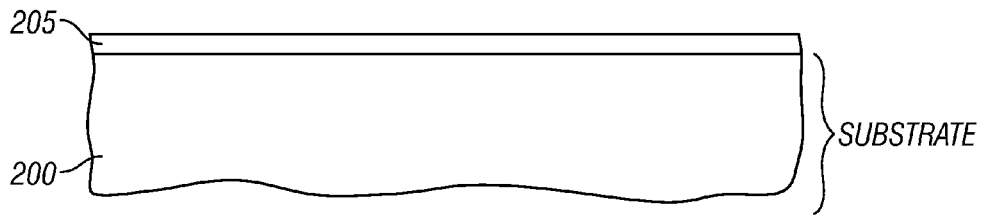
FIGS. 4A-4P are views of a small portion of one annular zone of the master mold at successive stages of the method of making the master mold according to the present invention for use in nanoimprinting the disk shown in FIG. 2.
Figure 4B:
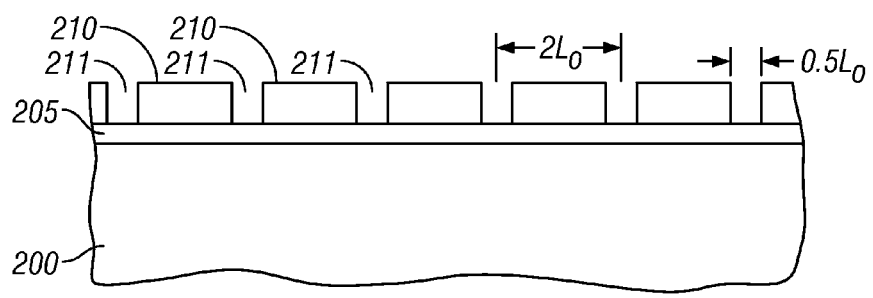
Figure 4C:
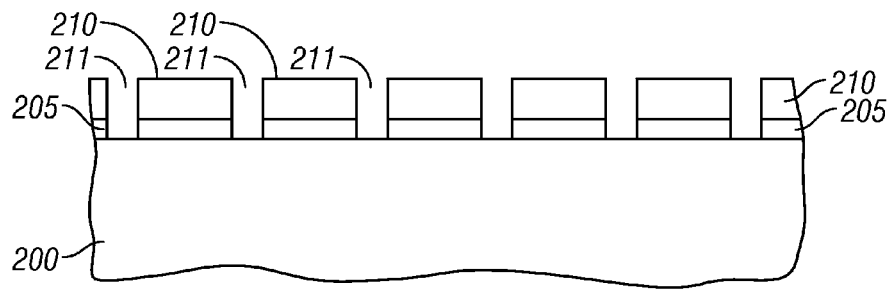
Figure 4D:
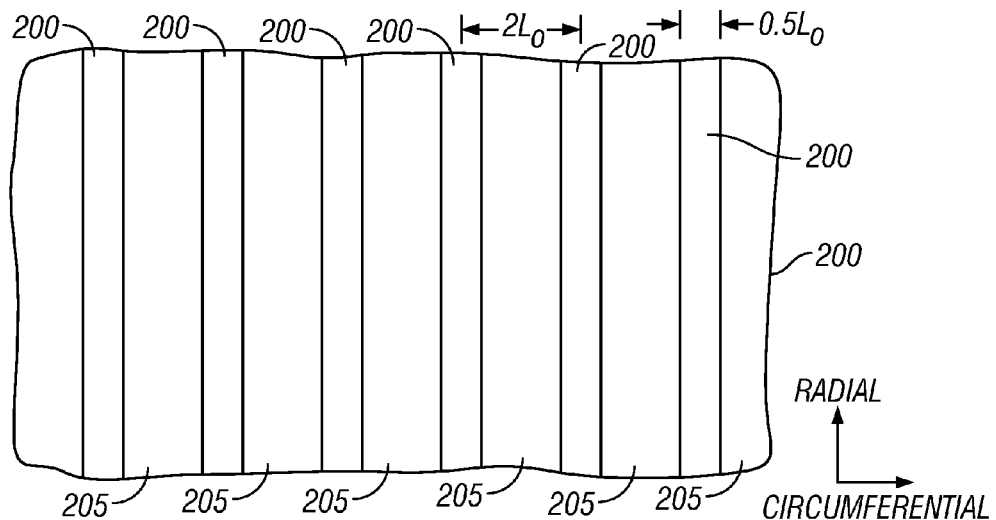
Figure 4E:
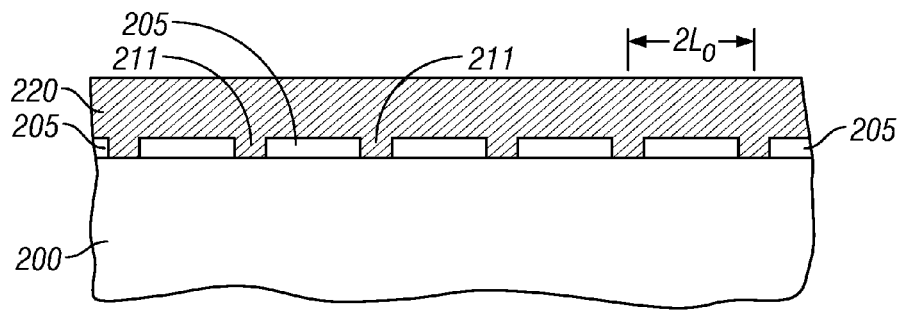
Figure 4F:
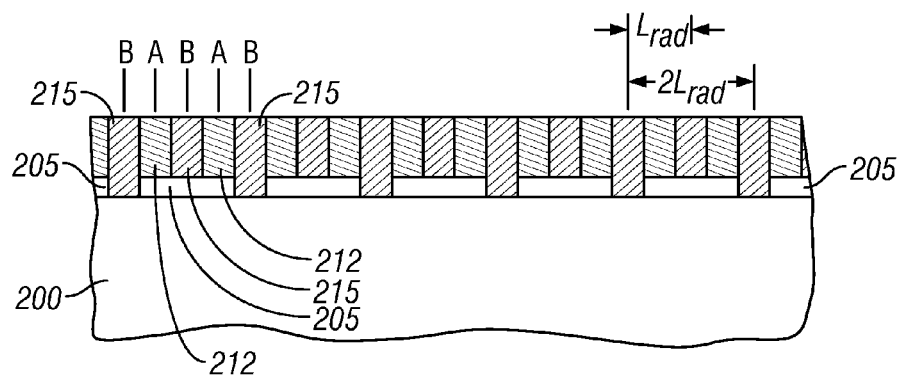
Figure 4G:
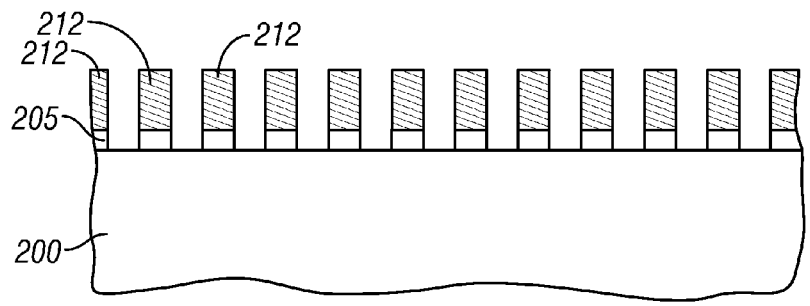
Figure 4H:
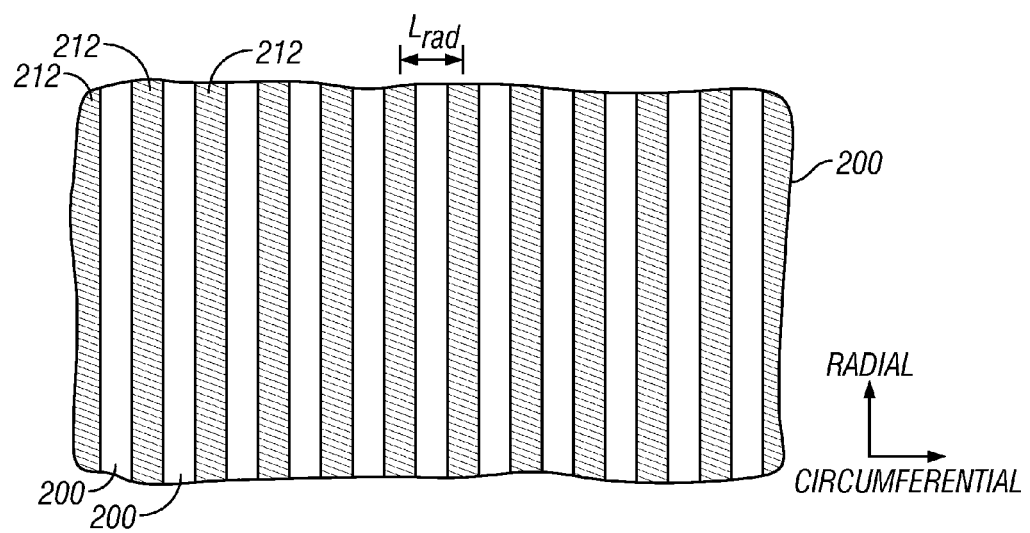
Figure 4I:
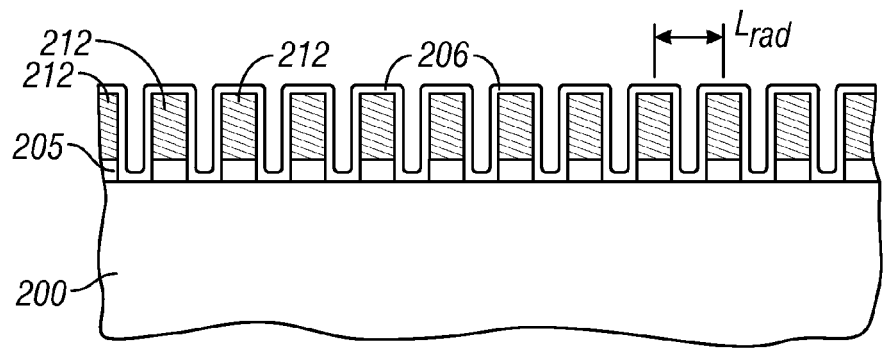
Figure 4J:
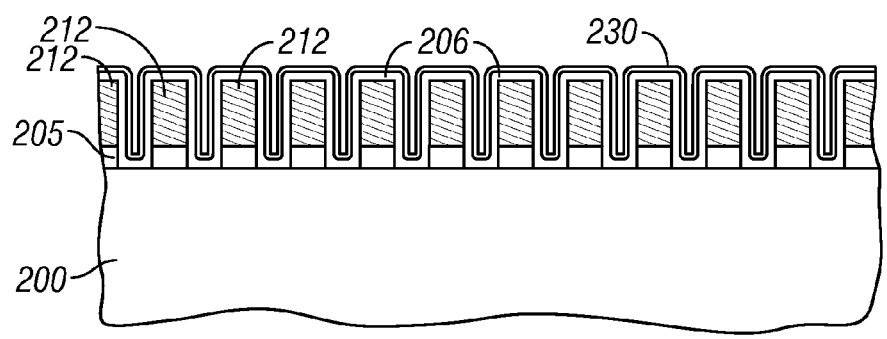
Figure 4K:
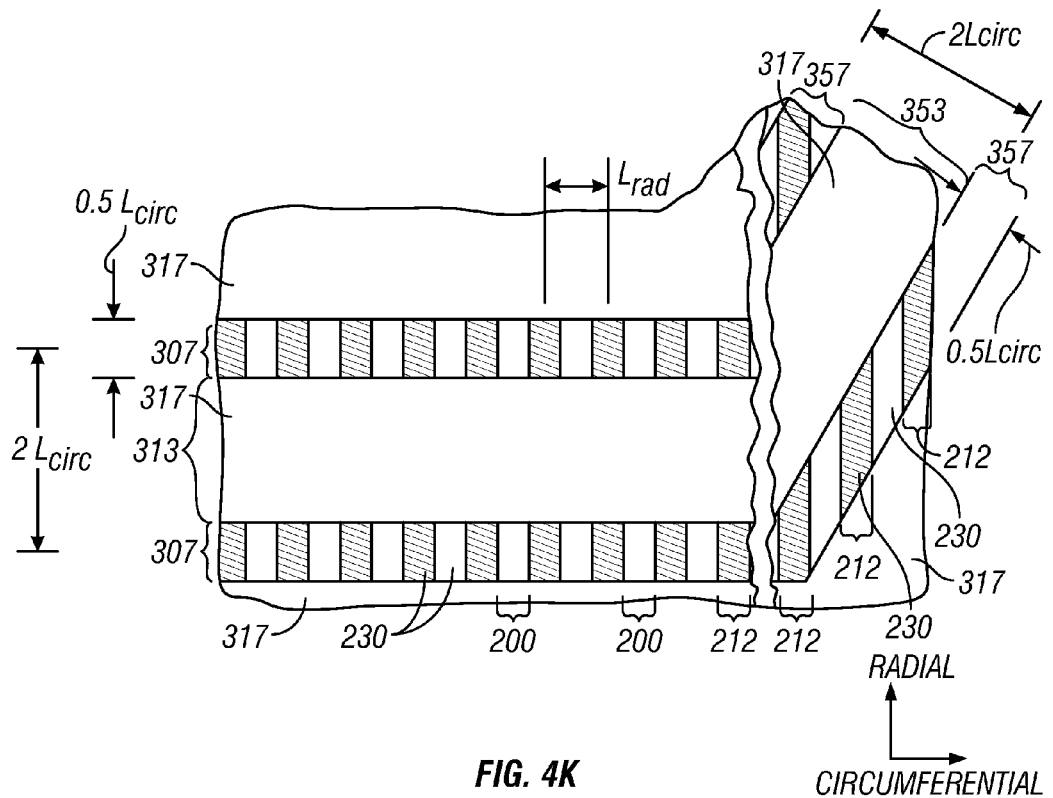
Figure 4L:
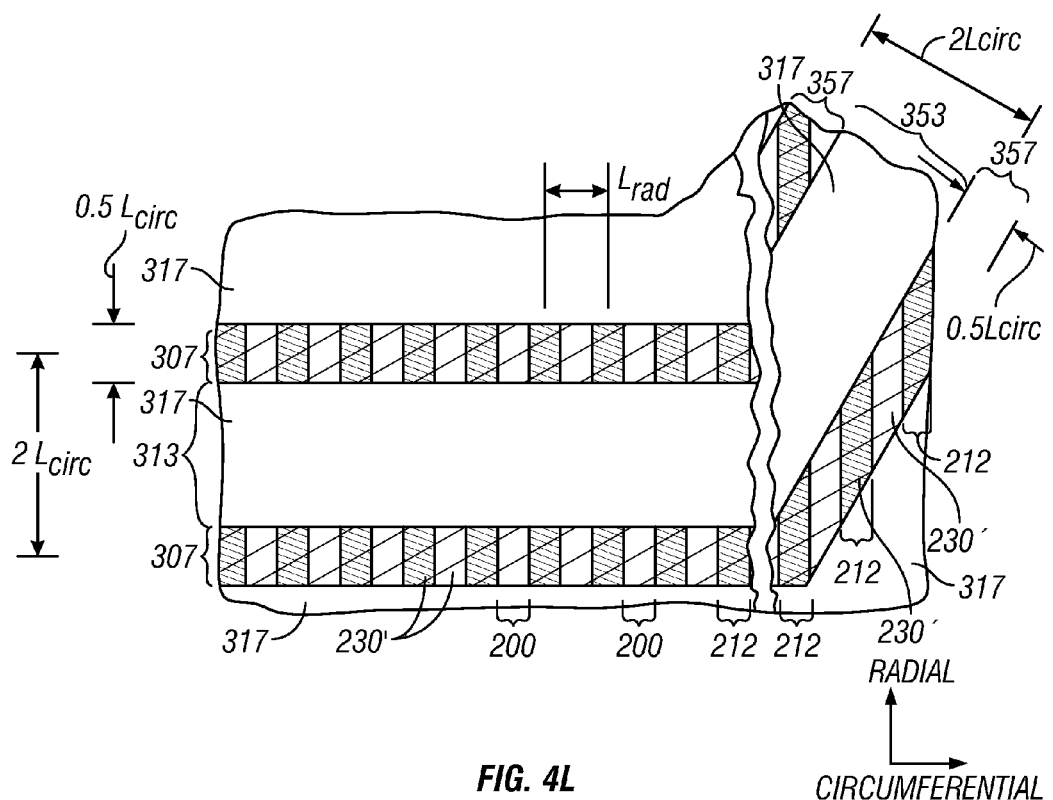
Figure 4M:
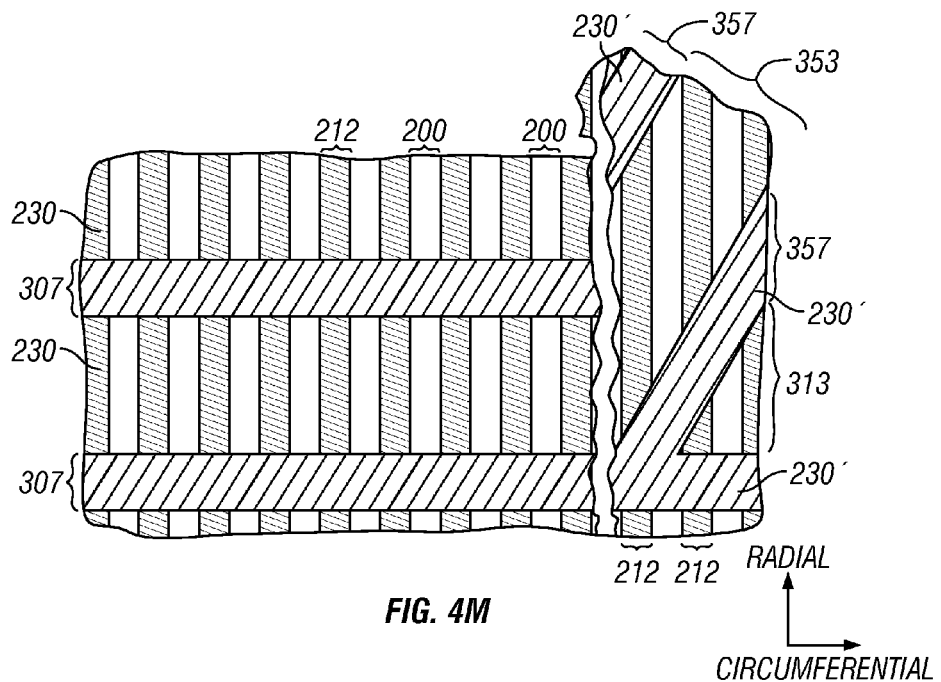
Figure 4N:
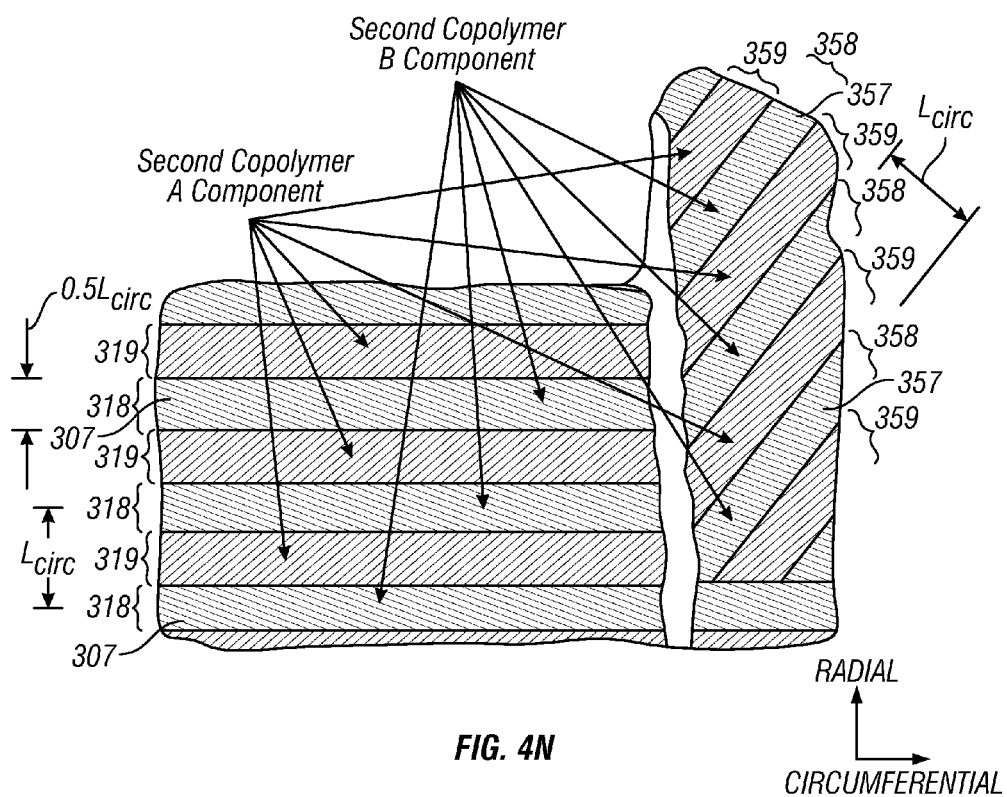
Figure 4O:
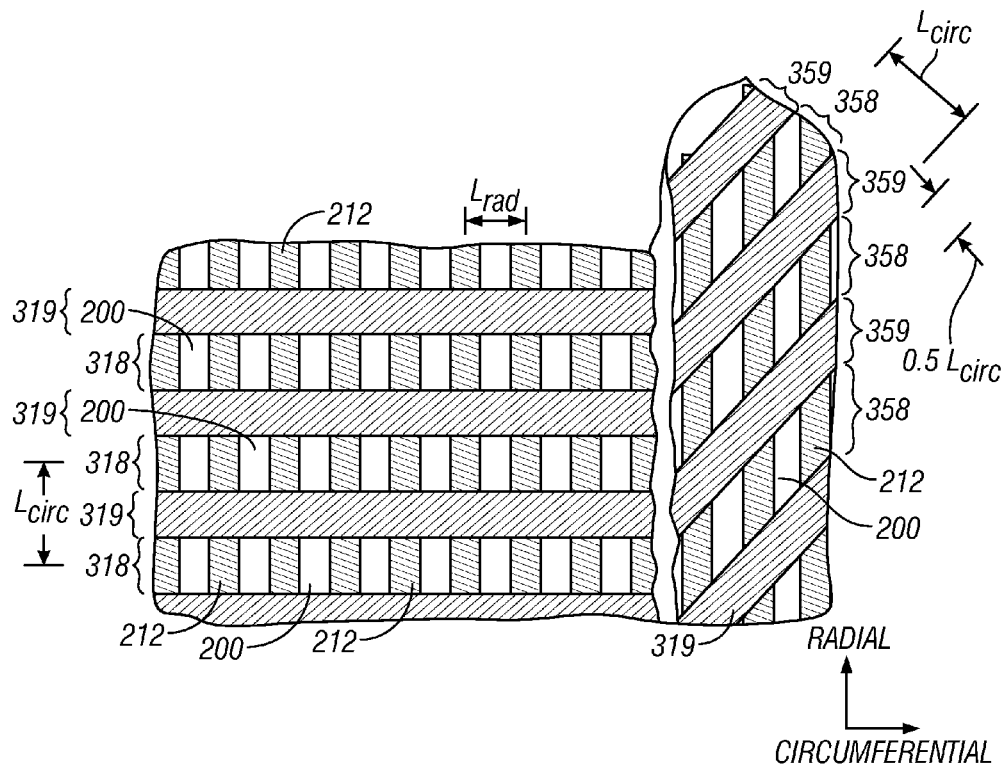
Figure 4P:
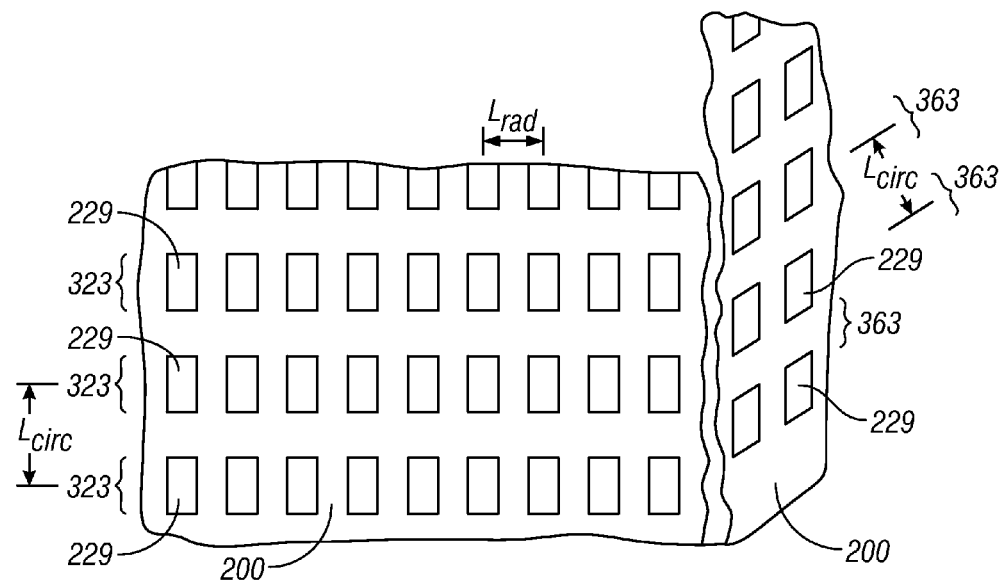

The method is explained with respect to FIGS. 4A-4P. FIGS. 4A-4C, 4E-4G and 4I-4J are side sectional views, at various stages of the fabrication method, taken through a plane generally perpendicular to the radial direction, and FIGS. 4D, 4H and 4K-4P are top views at various stages of the method.

As shown in FIG. 4A, the master mold substrate comprises a base 200, which may be formed of any suitable material, such as, but not limited to, single-crystal Si, amorphous Si, silica, quartz, silicon nitride, carbon, tantalum, molybdenum, chromium, alumina and sapphire. A surface modification layer 205 of a material that does not show a strong wetting affinity by one of the polymer blocks over the other, that will be referred to as "neutral layer", is deposited onto the base 200. The neutral layer can be, but is not restricted to, a functionalized polymer brush, a cross-linkable polymer, a functionalized polymer "A" or "B" or a functionalized random copolymer "A-r-B" or a blend of "A" and "B", where "A" and "B" are the constituent block materials of the block copolymer. The functional group may be, for example, a hydroxyl group. In the present example, the neutral layer 205 is a hydroxyl-terminated polystyrene brush of lower molecular weight than the block copolymer used. The brush material is spin-coated on base 200 to a thickness of about 1-10 nm (below 6 nm is preferred). The purpose of the neutral layer is to tune the surface energy adequately to promote the desired domain orientation (perpendicular lamellae or parallel cylinders) and to provide the adequate wetting conditions for density multiplication.

In FIG. 4B a resist layer has been deposited on brush layer 205 and patterned into generally radial bars 210 of resist. The resist layer is patterned by e-beam and developed to form the pattern of radial bars 210 separated by radial spaces 211 that expose portions of brush layer 205. The e-beam tool patterns the resist layer so that the radial spaces 211 have a circumferential spacing that is approximately an integer multiple of $L_0$ (i.e., $nL_0$), the known bulk period for the selected block copolymer that will be subsequently deposited. In FIG. 4B, n is 2. The circumferential width of each radial space 211 is selected to be approximately $0.5L_0$.

In FIG. 4C, the structure is etched, by a process of oxygen plasma reactive ion etching ($O_2$ RIE), to remove portions of brush layer 205 in the radial spaces 211, which exposes portions of base 200. Alternatively, the chemical structure of the exposed portions of brush layer 205 in the radial spaces 211 can be chemically altered (by oxygen plasma etching or other process such as reactive ion etching, neutral atom (such as Ar) or molecule milling, ion bombardment and photodegradation) so that the exposed portions of brush layer 205 have a preferred affinity for one of the copolymers. In FIG. 4D, which is a top view, the resist 210 is removed, leaving on the substrate 200 a pattern of generally radial bars 205 of polymer brush material separated by generally radial traces 200 of base material (or chemically-altered brush material). In this pattern the generally radial traces 200 have a circumferential width of about $0.5L_0$ and a circumferential pitch of $2L_0$. Because FIG. 4D is only a very small portion of the master mold, the traces 200 appear as parallel traces. However, the traces 200 are arranged generally radially, as depicted in FIG. 4. The traces 200 may be perfectly straight radial traces but are preferably arcs or arcuate-shaped radial traces that replicate the arcuate path of the read/write head on the rotary actuator.

Next, in FIG. 4E, a layer 220 of first block copolymer material is deposited over the radial bars 205 of brush material and the radial traces 200 of base material (or chemically-altered brush material) in the radial spaces 211. The preferred first block copolymer material is the diblock copolymer polystyrene-block-polymethylmethacrylate (PS-b-PMMA) with $L_0=L_{rad}$ between about 5 nm and 30 nm and is deposited by spin coating to a thickness of about $0.5L_{rad}$ to $3L_{rad}$.

In FIG. 4F, the first block copolymer layer has been annealed, for example by heating to about 200 deg. C. for approximately 60 minutes, which results in phase separation between the different components contained in the block copolymer. In this example, the B component (PMMA) has an affinity for the surface of base 200 or for the polar groups of the chemically altered brush 205 and thus form as generally radial lines 215 on top of the radial traces 200. Because the circumferential width of the traces 200 is approximately $0.5L_{rad}$, the A component (PS) form in adjacent radial lines 212 on the radial bars 205 of polymer brush material. As a result of the self-assembly of the A and B components this causes the B component to also form as generally radial lines 215 on the centers of each radial bar 205 of polymer brush material. The generally radial traces 200 (or chemically altered brush) thus guide the self-assembly of the PS and PMMA components to form the alternating radial lines 212, 215 in the structure as shown in FIG. 4F. Although the A and B components prefer to self-assemble in parallel lines with a period of $L_{rad}$, the substrate pattern of radial traces 200 guides the alternating lines 212, 215 to form as radial lines, which means that that $L_{rad}$ cannot be constant over the entire radial length. However, a pattern of alternating radial lines 212, 215 can be accomplished without any significant defects if the variation from $L_{rad}$ does not exceed approximately 10 percent. Thus, to achieve this, the circumferential spacing of the radial traces 200 at the zone ID should not be less than about $0.9nL_{rad}$ and the circumferential spacing of the radial traces 200 at the zone OD should not be greater than about $1.1nL_{rad}$.

Next, in FIG. 4G, the B component (PMMA) is selectively removed by a wet etch (acetic acid, IPA or other selective solvent) or a dry etch process ($O_2$ RIE), leaving generally radial lines 212 of the A component (PS). FIG. 4H is a top view of FIG. 4G and shows the generally radial A-component lines 212 with a circumferential spacing $L_{rad}$. In FIG. 4H the circumferential density of radial lines 212 has been doubled from the circumferential density of radial traces 200 in FIG. 4D. Any residual material from layer 205 is removed by a dry etch process, such as an $O_2$ reactive ion etching (RIE) process.

After the radial lines 212 have been formed as shown in FIG. 4H, they are cut into circumferential segments or rings that will correspond to the tracks on the patterned-media disks that will be nanoimprinted by the master mold. The first step in this part of the method is shown in the side sectional view of FIG. 4I in which a protective layer 206 is deposited over the structure of FIG. 4H. The protective layer 206 may be Si, $SiO_2$, alumina ($Al_2O_3$) or similar material sputter deposited to a thickness of approximately 1-2 nm. The purpose of the protective layer 206 is to prevent movement and/or dissolving of the radial lines 212 during subsequent processing. The radial lines 212 are circumferentially spaced-apart by a distance $L_{rad}$, where $L_{rad}$ is close to the bulk period of the first block copolymer material.

In FIG. 4J a surface modification or neutral layer 230, like neutral layer 205, is applied over the protective layer 206. Next, in FIG. 4K an e-beam resist film 317 is applied over the surface modification layer 230 and patterned into circumferential rings 313 and non-radial bands 353. The resist layer 317 is patterned by e-beam and developed to form the pattern of circumferential rings 313 separated by concentric boundary regions 307 and non-radial bands 353 separated by non-radial bars 357. The concentric boundary regions 307 correspond to the boundaries between the tracks 162 (FIG. 2) of the patterned-media disks to be nanoimprinted, and the non-radial bars 357 correspond to the boundaries between the non-radial stripes 180, 190 (FIG. 2) making up the servo pattern of the patterned-media disks to be nanoimprinted. The concentric regions 307 and non-radial bars 357 expose alternating portions of the substrate 200 (coated by layer 206) and portions of previously formed radial lines 212, which are covered with surface modification layer 230. The e-beam writer patterns the resist layer 317 so that the concentric regions 307 and non-radial bars 357 are spaced-apart by a distance $nL_{circ}$, where n is an integer and $L_{circ}$ is the bulk period of the second block copolymer material that will be subsequently deposited. In FIG. 4K, n=2 so that the radial width of the concentric regions 307 is $0.5L_{circ}$ and the width of the non-radial bars 357 in a direction perpendicular to the bars is $0.5L_{circ}$. Also, in this example, $L_{circ}$ is chosen to be $2L_{rad}$, as depicted in FIG. 4K.

In FIG. 4L, the exposed portions (regions 307 and bars 357) are etched or chemically altered by oxygen plasma etching (or other process such as reactive ion etching, neutral atom or molecule milling, ion bombardment and photodegradation) to remove or chemically alter the composition of the surface modification layer 230, as represented by etched or altered layer 230' in regions 307 and bars 357. In FIG. 4M, the e-beam resist is removed by use of a suitable solvent, leaving circumferential rings 313 and non-radial bands 353 of alternating radial lines 200 and 212 covered with surface modification layer 230 and concentric regions 307 and non-radial bars 357 of alternating portions of the substrate 200 and portions of previously formed radial lines 212 covered with the altered layer 230'.

In FIG. 4N, the second block copolymer material is deposited over the radial lines 212 covered with brush material 230 and the concentric boundary regions 307 and non-radial bars 357, which are covered with the altered brush layer 230'. The preferred second block copolymer material may also be the diblock copolymer polystyrene-block-polymethylmethacrylate (PS-b-PMMA). The characteristic bulk period, $L_0$, in a block copolymer is determined by its degree of polymerization, N, i.e., the number of constituent monomers in the polymer chain length. Block copolymers with different values of $L_0$ can be chosen by selecting the appropriate molecular weights. For example, a symmetric PS-b-PMMA with a total molecular weight of Mw=46 Kg/mol displays an $L_0$ of approximately 32 nm whereas one with Mw=36 Kg/mol exhibits an $L_0$ of approximately 27 nm. Other values for $L_0$ are known and described by Black, C. T., Ruiz, R., et al., "Polymer self assembly in semiconductor microelectronics", *IBM Journal of Research and Development*, Volume 51, Number 5, Page 605 (2007). The bulk period $L_0$ for the first block copolymer equals $L_{rad}$ and the bulk period $L_0$ for the second block copolymer material equals $L_{circ}$, with $L_{rad}$ and $L_{circ}$ being chosen according to the desired areal density and bit aspect ratio (BAR). For a BAR of approximately 2, $L_{circ}=2L_{rad}$, as shown in the example depicted in FIGS. 4I-4N. In FIG. 4N, the second block copolymer layer has been annealed, which results in phase separation between the different components contained in the block copolymer. In this example, the B component (PMMA) has an affinity for the chemically altered brush 230' in boundary regions 307 and non-radial bars 357 and thus form as generally circumferential rings 318 and non-radial stripes 358. Because the radial width of the regions 307 is approximately $0.5L_0$ and the width of the non-radial bars is approximately $0.5L_0$, the A component (PS) form in circumferential rings 319 and non-radial stripes 359. As a result of the self-assembly of the A and B components of the second block copolymer this causes the B component to also form as generally circumferential rings 318 between the A component rings 319 with radial spacing $L_{circ}$, and as non-radial stripes 358 between the A component non-radial stripes 359 with spacing $L_{circ}$.

In FIG. 4O, the B component (PMMA) is selectively removed, for example, by use of ultraviolet (UV) radiation followed by a rinse in a selective solvent, as described by Thurn-Albrecht, T. et al., "Nanoscopic Templates from Oriented Block Copolymer Films", *Advanced Materials* 2000, 12, 787. Then the remains of the surface modification layer 230 are removed, leaving circumferential rings 318 and non-radial stripes 358 of portions of alternating radial lines 212 (the A component of the first block copolymer) and 200 (the substrate). The resulting structure in FIG. 4O is a grid of circumferential rings 318 and non-radial stripes 358 of the A component (PS) of the second block copolymer and underlying radial lines 212 of the A component (PS) of the first block copolymer. This grid defines and exposes generally rectangular regions 200 of substrate material (covered with material 206) in the rings 318 and generally parallelogram regions 200 of substrate material (covered with material 206) in the non-radial stripes 358. The circumferential pitch of the radial lines 212 is defined by the periodicity of the first block copolymer film, while the radial pitch of rings 319 and the stripe pitch of stripes 359 is defined by the periodicity of the second block copolymer. In this method where both radial lines 212 and circumferential rings 319 and non-radial stripes 359 of PS material are defined by directed self-assembly of block copolymers, the order of the fabrication process may be reversed, i.e., the circumferential rings 319 and non-radial stripes 359 may be defined first followed by the assembly of the radial lines 212, which would then be located above the underling circumferential rings 319 and non-radial stripes 359.

Then, in FIG. 4P, a dry etch process is used to etch the substrate 200, including any portion of material 206 left on top of substrate 200, to form recesses or holes 229, using the grid of intersecting circumferential rings 319, non-radial stripes 359 and radial lines 212 as the etch mask. The PS material of circumferential rings 319, non-radial stripes 359 and underlying radial lines 212 is then removed by a $O_2$ RIE process, leaving holes 229 in substrate 200. This leaves the structure as shown in FIG. 4P with the holes 229 being arranged in circumferential segments 323 which correspond to the concentric tracks of the patterned-media disks to be nanoimprinted and non-radial segments 363 which correspond to the stripes of the chevron servo pattern of the disks to be nanoimprinted. The resulting disk will have a linear or along-the-track bit pitch of $L_{rad}$ and a track pitch of about $L_{circ}$. In the example of FIG. 4P, $L_{circ}=2L_{rad}$, for a BAR of about 2. The structure of FIG. 4P, which began as a substrate of base 200, has now been etched to define the pattern of holes 229 below the original surface of substrate material 200. The structure of FIG. 4P can function as the master mold with the holes 229 functioning as the topographic pattern for nanoimprinting the disks. Alternatively, the grid of intersecting circumferential rings 319, non-radial stripes 359 and radial lines 212 can be used as a lift-off mask by depositing or plating a suitable material (e.g., Cr, Ta or Mo) and subsequently removing the grid of the remaining polymer and using the plated material as an etch mask to create the structure of pillars (i.e., the reverse tone of FIG. 4P).

In the general method described above, the lithographic mask to fabricate the master template is defined by using the grid of intersecting circumferential rings 319, non-radial stripes 359 and radial lines 212 as the lithographic mask wherein the grid is made by the remaining block of the block copolymers used. A similar embodiment can be realized by transferring the block copolymer pattern to a plated grid as follows. After removing block B and leaving block A forming the generally radial lines 212 in FIG. 4G, a plating material (about 5 nm of Cr, Ta or Mo) is deposited on top followed by a removal by a wet or dry process of the remaining block A in lines 212, resulting in generally radial stripes of the plated material alternated by generally radial stripes of exposed substrate 200. The surface modification layer 230 is then deposited on top of the plated radial stripes and exposed substrate 200 as in FIG. 4J. The fabrication of the circumferential stripes by the second block copolymer follows the same procedure as before. Once the block B of the second block copolymer layer is removed, as in FIG. 4O, a second plating film is deposited (5 nm Cr, Ta or Mo) followed by subsequent dry or wet removal of remaining block A, leaving a grid of intersecting circumferential rings 319, non-radial stripes 359 and radial lines 212 made of the plating material. This new plated grid is then used as an etch mask for RIE to etch holes into the template as in FIG. 4P. Alternatively, instead of depositing a plating material in each of the steps above, an etch process can be used to etch generally radial lines using the first block copolymer film and generally circumferential lines and non radial stripes for the second block copolymer film. The result is a template with the reverse tone as that in FIG. 4P where the elements 229 are protruding pillars.

In the method described above, the two block copolymer components are depicted as self-assembling into alternating lamellae, as shown, for example, by alternating radial lines 212, 215 in FIG. 4F. For the A and B components (PS and PMMA) to form as alternating lamellae the molecular weight ratio of the A to B components should be between about 40:60 and 60:40, preferably close to 50:50. However, it is also within the scope of the invention for the A component (PS) to form as radially-aligned cylinders within a matrix of the B component (PMMA). To achieve this type of structure, wherein the A component cylinders form the radial lines 212 within alternating radial lines 215 of B component material, the molecular weight ratio of component B over component A should be less than about 80:20 but greater than about 60:40, preferably close to 70:30.

Referring again to FIG. 2, the method described above with respect to FIGS. 4A-4P results in the stripe width SW being substantially the equal to the radial width of the data islands 30. The ratio SW/TP (the duty cycle of the stripes) and the ratio of the radial width of the data islands to TP (the duty cycle of the data tracks) is depicted as being substantially the same, i.e., about ⅔ (67%), as shown by stripes 190a, 190b. Modeling has suggested that the duty cycle of the data tracks should be greater than 50% (preferably between about 60-80%) for best SNR and error rate on the data tracks. However, for the chevron pattern, the best SNR will occur with about a 50% duty cycle of the stripes. Thus it may be desirable to have different duty cycles for the data tracks and the stripes. Thus the data islands may have a cross-track width greater than the cross-stripe width of the stripes, but the TP and the stripe pitch may be substantially equal. Lamellar block copolymers generally tend to make patterns that are near a 50% duty cycle after annealing and after removal of one copolymer component, as depicted for example by rings 318, 319 and stripes 358, 359 in FIG. 4O. However, by applying subsequent processing steps differently to the two regions of the master mold (the data track region and the chevron pattern region), different duty cycles can be achieved. For example, if the chevron pattern (stripes 358, 359 in FIG. 4O) is temporarily masked by photoresist, and the data track region (rings 318, 319 in FIG. 4O) are subjected to an isotropic etch, the remaining block copolymer material will be eroded, resulting in an increase in the duty cycle of the data tracks. Also, directional deposition can be used to selectively change the duty cycle of one region, without need to mask the other region.

Referring again to FIG. 2, each of the stripes 180, 190 contains segments of magnetized material separated by nonmagnetic spaces. For example, stripe 180a includes typical magnetized segments 182a, 182b, 182c, 182d separated by nonmagnetic spaces. Similarly adjacent stripe 180b includes typical magnetized segments 184a, 184b, 184c separated by nonmagnetic spaces. The segmented stripes 180, 190 are the result of the disk nanoimprinted from a master disk fabricated according to the method described above with respect to FIGS. 4A-4O and results in the magnetized segments in the servo region 120 being portions of radial lines that are generally parallel to radial lines in the data track regions, like lines 170a, 170b. However, it is possible to fabricate the master mold so that the magnetized segments are segments of non-radial lines perpendicular to the stripes 180, 190. This may have the benefit of minimizing the effect of the nonmagnetic spaces between the magnetized segments on the signal from the stripes. This can be achieved during the fabrication steps that lead to the structure of FIG. 4D, which shows the radial bars 205 of polymer brush material and radial traces 200 of base material in the data track region, prior to deposition of the first block copolymer material. In FIG. 4B, the resist 210 in the chevron region would be patterned to form non-radial lines perpendicular to the desired direction of the non-radial stripes making up the chevron pattern, so that after deposition and annealing of the first block copolymer, and removal of the first component of the first block copolymer, there would be non-radial lines in the chevron region, like the radial lines 212 in the data track region shown in FIG. 4H.

It is also possible to from the stripes 180, 190 so that they are continuous magnetized stripes without segments and nonmagnetic spaces. However, this would require one or more additional lithography steps during fabrication of the master mold. After deposition and annealing of the first block copolymer, and removal of the first component of the first block copolymer, the radial lines 212 (FIG. 4H) in the servo region can be either removed by etching or covered so that their effect is eliminated in the final pattern in the servo region.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned-media perpendicular magnetic recording disk comprising:
    a disk substrate;
    a plurality of concentric generally circular data tracks on the substrate and patterned into discrete data islands of magnetizable material, the data islands having a bit pitch (BP) in the along-the-track direction and the tracks having a track pitch (TP) in the cross-track direction; and
    a plurality of angularly spaced servo sectors on the substrate and extending generally radially across a plurality of the data tracks, each servo sector comprising first and second circumferentially-adjacent fields of magnetized servo stripes slanted at an acute angle relative to the data tracks, the magnetized servo stripes having a stripe pitch in the cross-stripe direction substantially equal to TP, each of the magnetized servo stripes comprising magnetized segments oriented generally perpendicular to the along-the-track direction and separated by nonmagnetic spaces in the along-the-track direction, the magnetized segments in the servo stripes having a segment pitch in the along-the-track direction substantially equal to BP.

2. The disk of claim 1 wherein the stripes in the first field and the stripes in the second field are slanted in different directions.

3. The disk of claim 2 wherein the acute angle between the data tracks and the stripes the first field is substantially the same as the acute angle between the data tracks and the stripes in the second field.

4. The disk of claim 1 wherein, in each field, the magnetized segments in a servo stripe are aligned radially with magnetized segments in the other servo stripes in the field.

5. The disk of claim 1 wherein the discrete data islands have a cross-track width greater than the cross-stripe width of the magnetized stripes.

6. The disk of claim 1 wherein the plurality of concentric data tracks are arranged into a plurality of annular zones.

7. The disk of claim 1 wherein the data islands and servo stripes are pillars extending from the substrate.

8. The disk of claim 7 further comprising a planarization layer on the substrate between the pillars of data islands and servo stripes.

* * * * *